US011697931B2

(12) United States Patent
Levi

(10) Patent No.: US 11,697,931 B2
(45) Date of Patent: *Jul. 11, 2023

(54) SINKS AND METHODS OF MAKING THE SAME

(71) Applicant: Kraus USA Plumbing LLC, Port Washington, NY (US)

(72) Inventor: Russell Levi, Port Washington, NY (US)

(73) Assignee: Kraus USA Plumbing LLC, Port Washington, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/867,177

(22) Filed: Jul. 18, 2022

(65) Prior Publication Data

US 2022/0349163 A1 Nov. 3, 2022

Related U.S. Application Data

(63) Continuation of application No. 16/790,885, filed on Feb. 14, 2020, now Pat. No. 11,421,407.

(60) Provisional application No. 62/806,245, filed on Feb. 15, 2019.

(51) Int. Cl.
*E03C 1/186* (2019.01)
*A47J 47/20* (2019.01)

(52) U.S. Cl.
CPC ............. *E03C 1/186* (2013.01); *A47J 47/20* (2013.01)

(58) Field of Classification Search
CPC .................................................... E03C 1/186

USPC ..... 4/631, 619–621; 15/300.1, 159.1, 167.1; 68/2, 232
See application file for complete search history.

(56) References Cited

U.S. PATENT DOCUMENTS

| | | | |
|---|---|---|---|
| 4,374,695 A | 2/1983 | Ikeda et al. | |
| 4,462,126 A | 7/1984 | Cleaveland | |
| 5,016,297 A | 5/1991 | Sauter et al. | |
| 5,561,871 A | 10/1996 | Laughton | |
| 5,590,804 A | 1/1997 | Crum et al. | |
| 5,644,943 A | 7/1997 | Lanz | |
| D478,970 S | 8/2003 | Ziemann et al. | |
| 7,954,183 B2* | 6/2011 | Cawthon | A22C 17/08 4/654 |
| D648,838 S | 11/2011 | Booth | |
| 8,099,805 B1 | 1/2012 | Webb | |
| D746,419 S | 12/2015 | Kurth et al. | |
| D769,423 S | 10/2016 | Lilly et al. | |
| D849,895 S | 5/2019 | Bucher | |
| 11,421,407 B2* | 8/2022 | Levi | E03C 1/186 |
| 2003/0204905 A1 | 11/2003 | Ziemann et al. | |
| 2006/0242761 A1 | 11/2006 | Babick et al. | |
| 2008/0086812 A1* | 4/2008 | Yu | E03C 1/18 4/639 |
| 2012/0222213 A1 | 9/2012 | Booth et al. | |

(Continued)

FOREIGN PATENT DOCUMENTS

| | | | | |
|---|---|---|---|---|
| CA | 3072734 A1 * | 8/2020 | ............. | A47J 47/20 |
| CN | 108414927 A * | 8/2018 | .......... | G01R 31/327 |

*Primary Examiner* — Lori L Baker
(74) *Attorney, Agent, or Firm* — Bose McKinney & Evans LLP

(57) ABSTRACT

A sink includes a bottom surface forming an opening for drainage therein, a first sidewall, a second sidewall, a third sidewall, and a fourth sidewall. A divider is fixedly attached to a linear opening in the first and third sidewalls and the bottom surface.

21 Claims, 10 Drawing Sheets

(56) References Cited

U.S. PATENT DOCUMENTS

| | | |
|---|---|---|
| 2015/0067962 A1 | 3/2015 | O'Brien et al. |
| 2015/0368889 A1 | 12/2015 | Hanson |
| 2020/0263401 A1 | 8/2020 | Levi |
| 2022/0349163 A1* | 11/2022 | Levi .................. E03C 1/186 |
| 2022/0349164 A1* | 11/2022 | Levi .................. E03C 1/18 |

* cited by examiner

SINKS AND METHODS OF MAKING THE SAME

CROSS-REFERENCE TO RELATED APPLICATIONS

The present application is a continuation of U.S. patent application Ser. No. 16/790,885, filed Feb. 14, 2020, which claims priority to U.S. Provisional Patent Application Ser. No. 62/806,245, filed Feb. 15, 2019, the disclosures of which are expressly incorporated by reference herein.

FIELD OF THE DISCLOSURE

The present technology is generally related to sinks and methods for making the sinks.

BACKGROUND AND SUMMARY OF THE DISCLOSURE

Generally, sinks have been used for residential and commercial kitchens and bathrooms because they can contain fluid and/or materials in their interior space and operations can be performed therein such as cleaning and washing dishes, pots, utensils, etc. and preparing food. Modem sinks add both functionality and decorative decor and are manufactured from many materials and in many designs. In the current marketplace, stainless steel sinks are particularly desirable. Most applications utilize fairly standard sized sinks to accommodate the limitations of existing spaces and to reduce the cost of pure custom designed furniture and plumbing work.

Prior art kitchen and bathroom sinks are often installed in cabinets and are typically mounted to the countertop via drop in, as under mount or a flush mount, described as the relationship between the rim of the sink and the countertop. Typically, prior art sinks have a rim or flange that is flat, thin and narrow with rounded edges. Drop in sinks are placed through a pre-cut hole in the countertop with the flange or lip around the sink providing a substantial portion of the support. Common problems of drop in sinks include improper seating of the flange in the pre-cut countertop, gaps between the flange and the countertop and insufficient flange support for the weight of the basin.

In addition, materials and conventional sink manufacturing methods have inherent limitations on the suitability and sustainability of many sink designs for drop in sinks. For example, stainless steel sinks are traditionally stamped from sheet metal or punched from a mold, resulting in rounded or beveled edges. This rounded edge feature creates undesirable gaps between the edges of the sink and the countertop.

Still further, with limited counter space in many homes, home owners are using the sink space for preparing food. Thus, the size of the inner space of the sinks is important based on the needs of the homeowner and some sinks may include a divider for such purposes. Current manufacturing processes of sinks with dividers to form two separate basins have compromised the sustainability and durability of such metal sinks.

Moreover, because counter space is limited and sink space has become useful for food preparation a multi-workstation sink that can perform different functions is desired. Accordingly, it is desirable to provide a durable and sustainable sink unit with a novel rim or flange for mounting with the option of a divider in the basin to form multiple basins for different uses and adapted to be used as a multi-workstation sink.

The techniques of this disclosure provide a sink, and methods of making a durable and sustainable sink, which can be firmly attached to a countertop of a cabinet or any other fixtures, which provides at least two basins without substantially decreasing the volume of the sink, and which functions as a multi-workstation sink.

In accordance with aspects of the disclosure, a sink includes a bottom surface forming an opening for drainage therein, a first sidewall, a second sidewall, a third sidewall, and a fourth sidewall, each of which is extended from the bottom surface, and a ledge fixedly attached to top ends of the first, second, third, and fourth sidewalls. The bottom surface and the first, second, third, and fourth sidewalls have a same thickness, and a thickness of the ledge is different from the thickness of the bottom surface.

In various embodiments, the thickness of the ledge is greater than or equal to 3 millimeters.

In various embodiments, the thickness of the bottom surface is less than or equal to 1.6 millimeters.

In various embodiments, the ledge includes first, second, third, and fourth parts, which correspond to the first, second, third, and fourth sidewalls, respectively.

In various embodiments, an outer part of the ledge is beveled.

In various embodiments, the sink further includes a divider fixedly attached to a linear opening in the first and third sidewalls and the bottom surface.

In various embodiments, a width of the divider is greater than or equal to 3 mm.

In various embodiments, the divider is welded to the linear opening.

In various embodiments, the sink further includes at least one floating ledge on two facing sides of the first, second, third, and fourth sidewalls.

In various embodiments, the floating ledge is substantially parallel with the bottom surface.

In accordance with aspects of the disclosure, a method for manufacturing a sink includes cutting a first metal to form a bottom surface, a first sidewall, a second sidewall, a third sidewall, and a fourth sidewall, cutting an opening for drainage in the bottom surface, folding boundaries between the bottom surface and each of the first, second, third, and fourth sidewalls, welding an edge of each pair of adjacent two sidewalls of the first, second, third, and fourth sidewalls so as to make the first, second, third, and fourth sidewalls upright from the bottom surface, and welding four pieces of a second metal different from the first metal used in the cutting to make a ledge having first, second, third, and fourth parts, welding the ledge to top ends of the first, second, third, and fourth sidewalls. The bottom surface and the first, second, third, and fourth sidewalls have a same thickness, and a thickness of the ledge is different from the thickness of the bottom surface.

In various embodiments, the thickness of the ledge is greater than or equal to 3 millimeters.

In various embodiments, the thickness of the bottom surface is less than or equal to 0.16 millimeters.

In various embodiments, the ledge includes first, second, third, and fourth parts, which correspond to the first, second, third, and fourth sidewalls, respectively.

In various embodiments, the method further includes beveling an outer part of the ledge.

In various embodiments, the method further includes cutting off a linear opening in the first and third sidewalls and the bottom surface, and welding a divider into the linear opening.

In various embodiments, a width of the divider is greater than or equal to 3 mm.

In various embodiments, the method further includes folding a portion of one sidewall among the first, second, third, and fourth sidewalls to form at least one floating ledge protruding from the one sidewall.

In various embodiments, the floating ledge is substantially parallel with the bottom surface.

In accordance with aspects of the disclosure, a non-transitory computer readable medium stores instructions that, when executed by a computer, cause the computer to perform a method for manufacturing a sink. The method includes cutting a first metal to form a bottom surface, a first sidewall, a second sidewall, a third sidewall, and a fourth sidewall, cutting an opening for drainage in the bottom surface, folding boundaries between the bottom surface and each of the first, second, third, and fourth sidewalls, welding an edge of each pair of adjacent two sidewalls of the first, second, third, and fourth sidewalls so as to make the first, second, third, and fourth sidewalls upright from the bottom surface, and welding four pieces of a second metal to make a ledge having first, second, third, and fourth parts. The ledge to top ends of the first, second, third, and fourth sidewalls, the bottom surface and the first, second, third, and fourth sidewalls have a same thickness, and a thickness of the ledge is different from the thickness of the bottom surface.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION OF THE DRAWINGS

Figure 1:
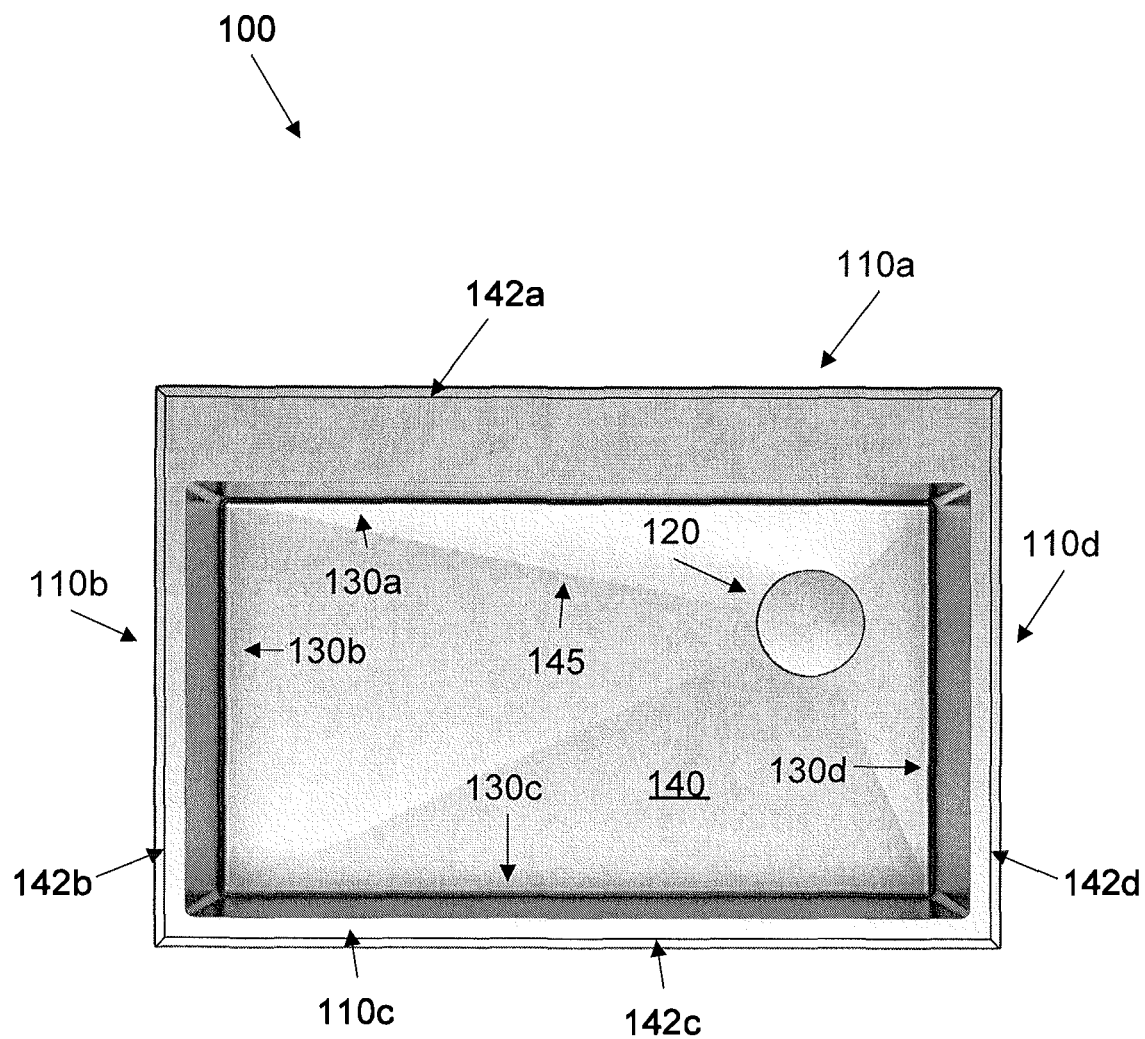
FIG. 1 is a top view of a sink with one basin in accordance with embodiments of the disclosure.

As disclosed, sinks may be configured to include one or more basins. The sinks may also be configured to include one or more floating ledges without decreasing the total volume of the sink. Further, the sinks may include one or more steps, ledges or flanges, which increase the volume of the sink. Furthermore, the thickness of a ledge, which is welded to the one or more basins, may be configured to be different from the thickness of the basin of the sink. The list of sinks as described in this disclosure provide examples and can include other variants as readily appreciated by a person of ordinary skill in the art.

Like numerals in the present disclosure generally refer to the same parts or elements of the sinks. For example, 130a-130d of FIG. 1, 230a-230d of FIG. 2, 530a-530d of FIG. 5, and 630a-630d of FIG. 6 refer to the same parts or elements for four vertical sidewalls of the sinks. When descriptions for the same parts for different sinks are duplicative or redundant, such descriptions may be omitted for the sink and refer to the corresponding descriptions for sinks previously described.

Some reference numerals are omitted from the figures because such reference numerals can be readily appreciated by a person having skill in the art even with omission thereof. For example, FIG. 4 does not include 430a-430d because a person of skill in the art would readily appreciate the four vertical sidewalls of the sink even with omission of such reference numerals. In this case, descriptions of the omitted reference numerals can be found in sinks previously described in FIGS. 1-3.

Referring to FIG. 1, a sink 100 includes four parts 110a-110d (as a whole "110") of a ledge, a drain 120 for draining liquids or foodstuffs, four vertical walls or sides 130a-130d, and a bottom surface 140. The four vertical sidewalls 130a-130d and the bottom surface 140 form a basin, which provides an inner space for performing operations, such as washing.

The ledge 110 may be provided so that the sink 100 may sit on a countertop of a cabinet. The ledge, which is a combination of the four parts 110a-110d and is referred to as deck 110, may be formed by any material known in the sink art, such as stainless steel. The four vertical sidewalls 130a-130d and the bottom surface 140 may be formed by the same material, such as stainless steel. As known in the art, steel is measured by gauge, with thinner stainless steel having a higher gauge number, and thicker stainless steel having a lower number. For example, an 18 gauge (0.05 inches) sink is more durable and more expensive than a 22 gauge (0.0312 inches) stainless steel sink which are more susceptible to bowing, denting and dings. Stainless steel made of thin gauges is adequate for smaller sinks. However, larger sinks are more efficient and functional when they are thicker. A 20 gauge, which is 0.0375 inches, is a better option with 18-19 gauge sinks being a standard size and at the lower end of the price scale. An even more costly and better quality sink is a 16 gauge, and is 0.0625 inches (about 1.59 millimeters ("mm")) in thickness, mostly used in commercial establishments.

In the present disclosure, the thickness of the deck 110 may be thicker than the thickness of the material that forms the four vertical sidewalls 130a-130d and the bottom surface 140. In an aspect, the material that forms the four vertical sidewalls 130a-130d and the bottom surface 140 may be 16-gauge stainless steel (about 159 mm) and the deck 110 may be at least 3 mm (about 0.12 inches) stainless steel. Thus, the deck 110 being about twice as thick as the four vertical sidewalls 130a-130d can provide more durability and stability than simply a total 16-gauge stainless steel sink. In an aspect, the material, which forms the deck 110, the four vertical sidewalls 130a-130d, and the bottom surface 140, may be any metal or non-metal, which can be utilized and readily understood for sinks by a person having skill in the art.

In an aspect, the part 110a of the deck 110 may be wider than the other three parts 110b-110d of the deck 110 and is configured to house the faucet, a filter, a dispenser for soap or lotion or other items known in the art and any accessories typically found near a faucet. In another aspect, the four parts 110a-110d may have the same thickness.

The deck 110 may be beveled at outer portions 142a-142d of the four parts 110a-110d. By decreasing the thickness of the deck 110 toward the countertop of the cabinet, the sink 100 may appear to be integrated with the countertop. In other words, the transition from the countertop to the deck 110 may be smooth. In other words, when an item is swept into the sink 100, the item is not caught in or under the deck 110 of the sink 100. The shape of the beveled outer portions 142a-142d may be linear or curved.

The sink 100 further has four grooves 145 starting from the drain 120 to four corners formed by the four vertical sidewalls 130a-130d and the bottom surface 140. The four grooves 145 may lead water or fluid in the basin to the drain 120 to expedite drainage. The four grooves 145 may further provide for aesthetic features.

The location of the drain 120 may be determined based on needs of customers. For example, the drain 120 may be located in the center, top right, top left, bottom right, or bottom left of the bottom surface 140 of the basin.

Figure 2:
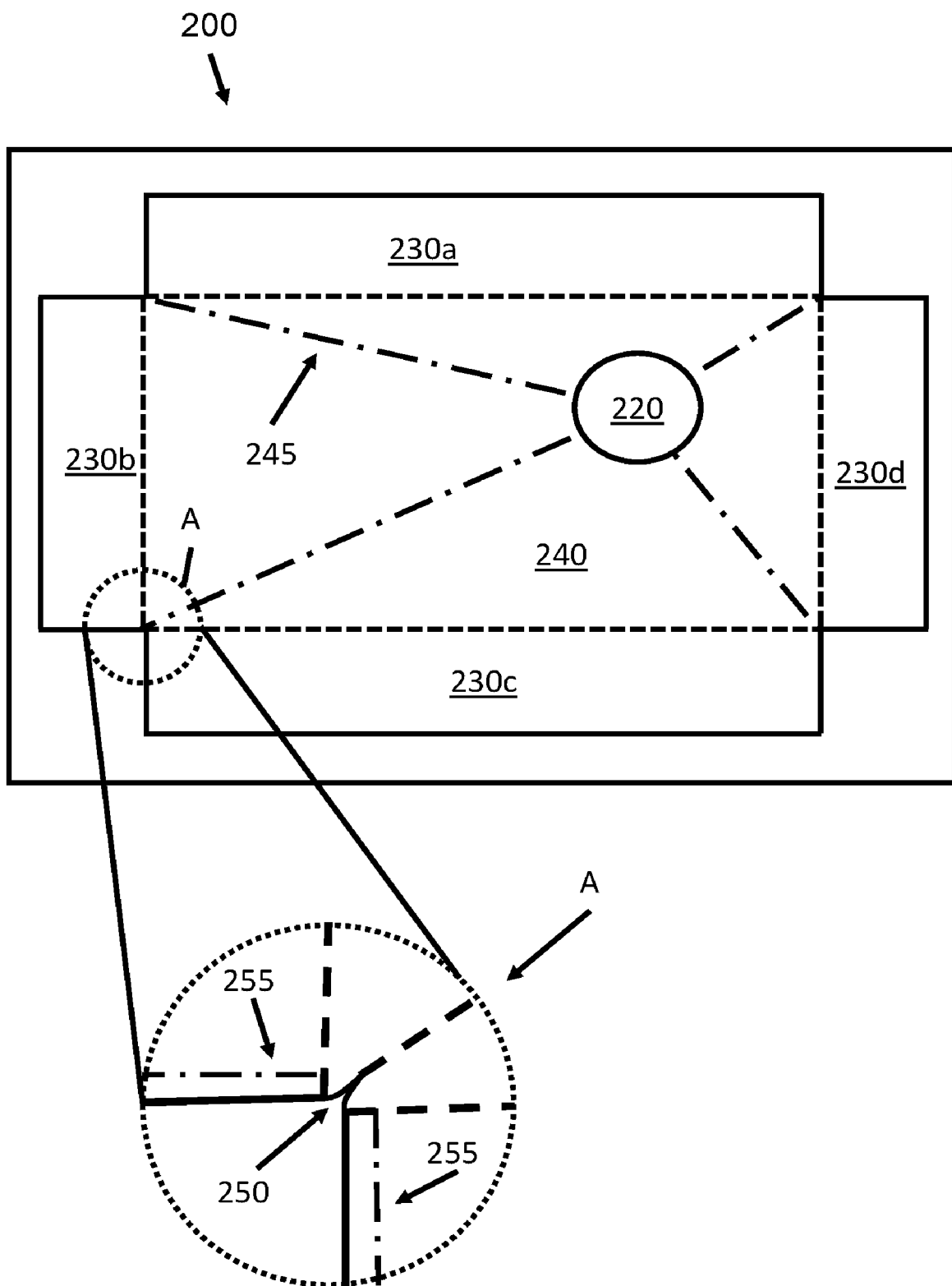
FIG. 2 is a diagram of the basin of FIG. 1 in accordance with embodiments of the disclosure.

Referring to FIG. 2, and a method of making a sink of the present disclosure, a two-dimensional pattern 200 for the basin of the sink 100 of FIG. 1 is drawn on a material, which may be stainless steel. The pattern 200 includes a drain 220, similar to drain 120, four rectangles 230a-230d, similar to the four vertical sidewalls 130a-130d, and a bottom 240, similar to the bottom surface 140. Thus, the pattern 200 is a basin of the sink 100 after cutting, folding, welding, and smoothening out the sink.

The pattern 200 may be drawn on a sheet of stainless steel, of which thickness may be equal to or less than 16 gauge or about 1.6 mm. The pattern 200 has dotted lines and solid lines. The solid lines are to be cut, and the dotted lines are to be folded ninety degrees toward the inside. The pattern 200 also includes dash-dotted lines 245, which are to be pressed to make the dash-dotted lines 245 groove downward. Such grooves may facilitate water or any liquid to the drain 220. Pressing may form a declining angle of about 3° to about 8° from the normal plane or main level of the base of the sink. Further, the pressing may cause the bottom of the drain 220 to be lower than the general bottom of the basin.

The bottom surface of the basin may be downwardly inclined toward the drain 220 while pressing the dash-dotted lines 245. With the grooves and the downward inclination toward the drain 220, the water or fluid contained in the sink 100 can be drained efficiently.

For example, the outer boundaries, solid lines, of the four rectangles 230a-230d are cut and the inside boundaries, dotted lines, of the four rectangles 230a-230d are folded ninety degrees toward the inside or facing each other. The solid circular line 220 of the bottom 240 is cut so as to make an opening for drainage in the bottom 240.

The pattern 200 also includes four corners, where adjacent two of the four rectangles 230a-230d meet. Area A where the rectangles 230b and 230c meet is magnified to show details of the corner of the pattern 200. As shown, the rectangles 230b and 230c do not perpendicularly meet at the corner. Rather, a portion of the corner is cut toward the inside by a predetermined distance. After the four rectangle parts 230a-230d are folded to make four vertical sidewalls of the sink 100, each pair of adjoining edges of the four rectangles 230a-230d is welded together and smoothened out.

The circular portion referenced by "A" shows an expanded view of one of four bottom corners, meaning that the other three bottom corners have the same shape as shown in the expanded view. The corner has a cut-out portion to be welded and smoothened out. Thus, the welded and smoothened cut-out corner 250 makes the corner round and smooth without a sharp corner or edge. The shape of the cut-out corner 250 may be in any shape, which may turn out smooth and round when welded.

Further, the expanded view also includes dash-dotted lines 255 along the vertical sidewalls and starting around the cut-out portion 250. The dash-dotted lines 255 are to be pressed similar to the dash-dotted lines 245. When the dash-dotted lines 255 are pressed and the dotted lines are bent, two adjacent vertical lines of the vertical sidewalls 230b and 230c meet each other and become smooth and rounded when welded together.

Furthermore, the folded lines of the four rectangles 230a-230d may be also smoothened out in a similar manner as the dash-dotted lines 255 are pressed and welded together.

In another aspect, the welding may be performed by laser, light, or any metal arc welding means. Further, the welding is performed outside of the sink 100, such that the welding marks are not seen from the inside of the sink 100.

Figure 3A:
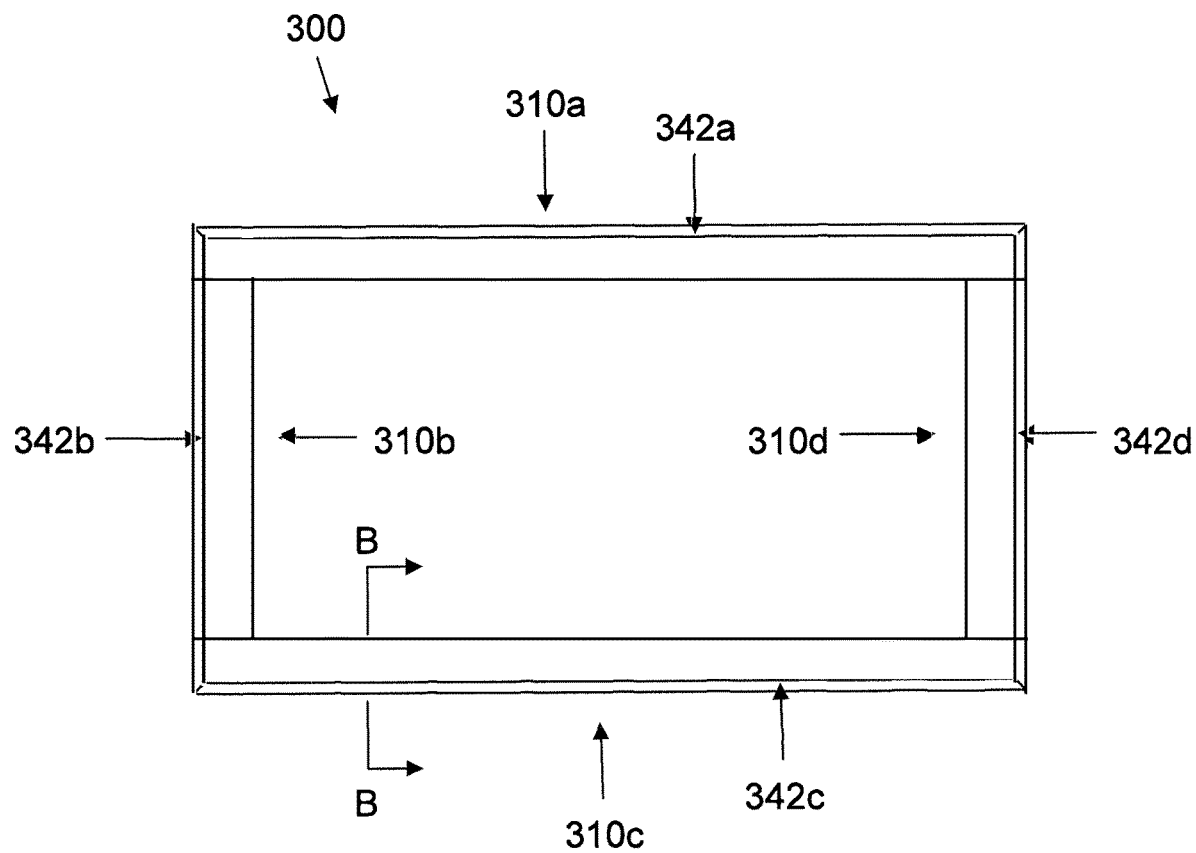
FIG. 3A is a diagram of a ledge of the sink of FIG. 1 in accordance with embodiments of the disclosure.

Next, the basin of the sink 100 needs to be welded with a deck to complete the sink 100. FIG. 3A shows a deck 300 including four parts 310a-310d. These four parts 310a-310d may be cut out from a sheet of stainless steel. The thickness of the stainless steel of the deck 300 may be thicker than the stainless steel for the basin. In an aspect, the thickness of the deck 300 may be 3 mm while the thickness of the stainless steel for the pattern 200 may be 16 gauge or about 1.6 mm.

In an aspect, the end portions of the four parts 310a-310d may have a 45° shape so that, when the four parts 310a-310d are put together, the four parts 310a-310d may form a deck.

Figure 3B:
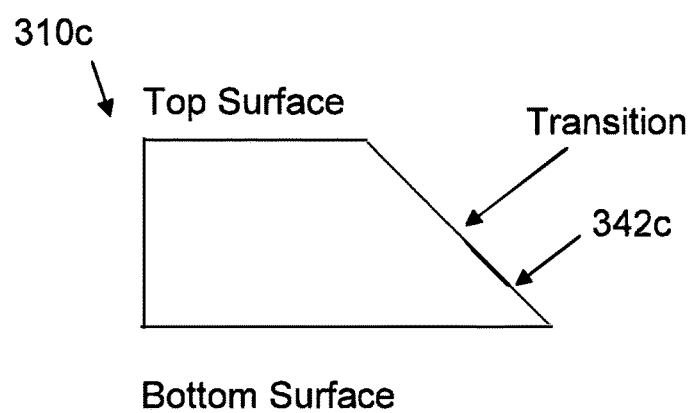
FIG. 3B is a cross-sectional view of the ledge 300 of FIG. 3A in accordance with embodiments of the disclosure.

The four parts 310a-310d may be welded together to form the deck 300 as the deck 110 of FIG. 1. The welding may be performed outside of the basin so that the welding marks are not seen from inside of the basin. The outer portions 342a-342d of the deck 300 may be beveled so that the thickness becomes shallow toward the end of the outer portion of the deck. For example, FIG. 3B shows a cross-sectional view of the deck 300 along the B-B direction of FIG. 3A. The slope from the top surface of the deck 300 to the bottom surface of the deck 300 may be linear as shown in FIG. 3B. The connection (i.e., beveled outer portion 342c) between the edge of the top surface and the edge of the bottom surface may be linear, concave, convex, or curved. In this way, when the sink 100 sits on a countertop, the outer edges of the deck 300 forms a smooth transition between the sink 100 and the countertop.

The inside of the deck 300 may match the inside of the basin formed from the pattern 200 of FIG. 2. When welded to the basin of FIG. 2, the deck 300 appears protruding outside from the top of the basin. Further, the deck 300 may sit on a countertop of a cabinet. In an aspect, the deck may be glued to the bottom surface of the countertop of the cabinet. Due to the thickness of the deck 300, which is greater than the thickness of the basin, the deck 300 may provide more stability and durability in holding materials and liquid inside the basin. Further, the thickness of the deck 300 may prevent waviness after installation and damages during shipping, thereby making the deck 300 more durable.

Figure 4:
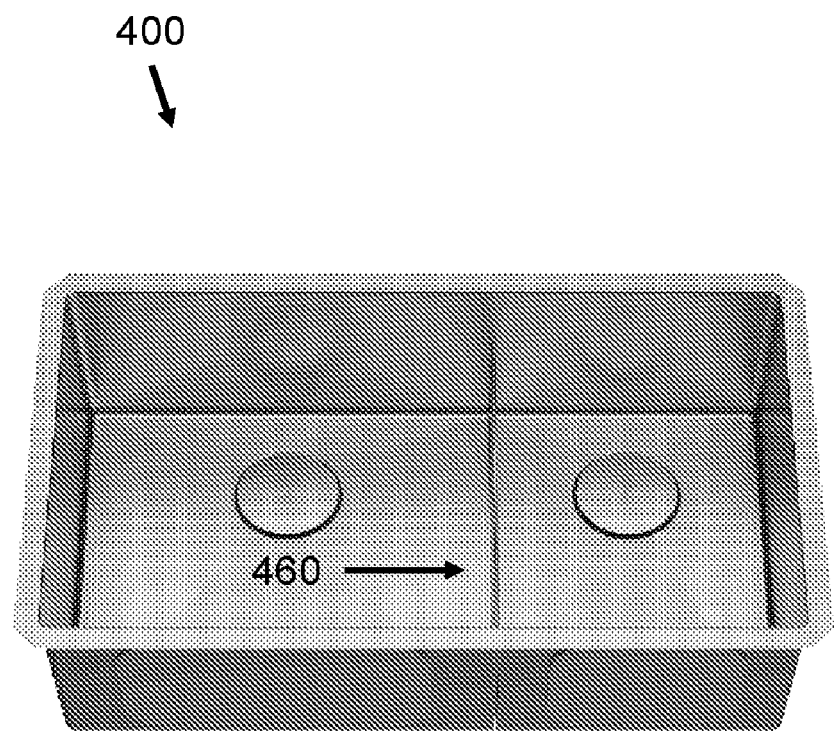
FIG. 4 is a perspective view of a sink with two basins and a divider in accordance with embodiments of the disclosure.

FIG. 4 illustrates a sink 400 in accordance with embodiments of the present disclosure. The sink 400 includes every element of the sink 100 of FIG. 1 and a divider 460, such that sink 400 has two basins. The sink 400 may have one drain in each basin. Descriptions of similar or same elements of the sink 400 as the sink 100 of FIG. 1 may be found in FIGS. 1-3 above.

The height of the divider 460 may be less than the height of the basin of the sink 400 so that movements of solid or liquid between two basins are easier. In an aspect, the thickness of the divider 460 may be from about 2.5 mm to about 5 mm, with embodiments of about 4 mm or 0.16 inches. In an aspect, the material of the divider 460 is the same as the basin of the sink 400. Even though the thickness of the divider 460 is greater than the thickness of the basin or the deck of the sink 400, 0.16 inches is much smaller than the conventional dividers in the sink art. Thus, the divider 460 is very thin compared to the volume of the basin and may not substantially reduce the volume of the inner space of the basin. The divider 460 may be positioned in the middle, more towards the right or more towards the left in a width direction.

Figure 5A:
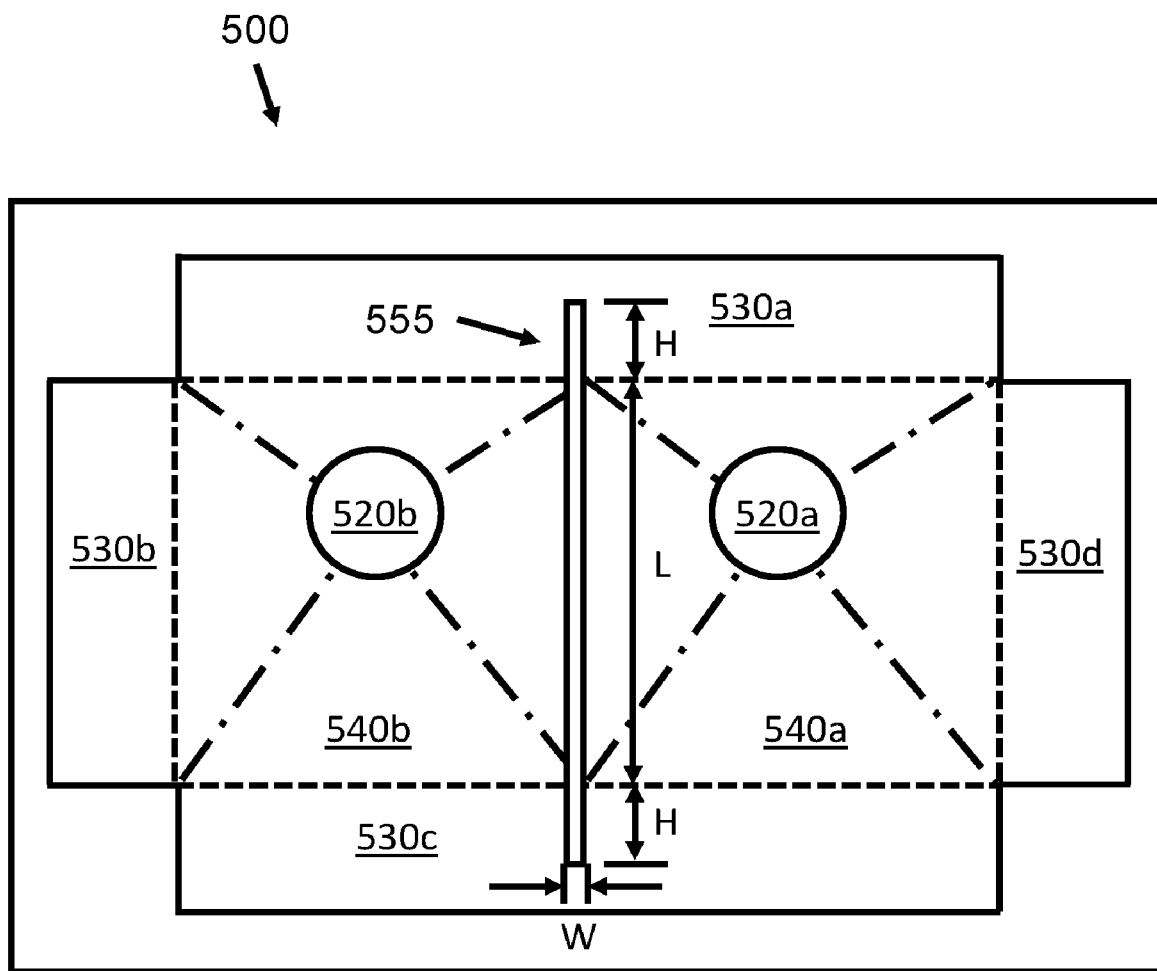
FIG. 5A is a diagram of the basin of FIG. 4 in accordance with embodiments of the disclosure.
Figure 5B:
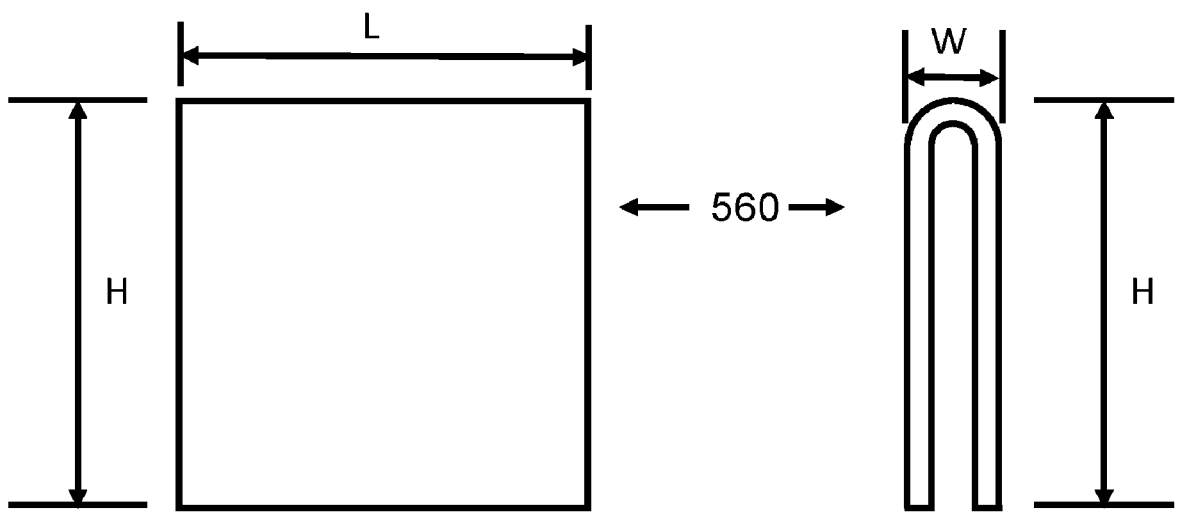
FIG. 5B is a cross sectional view of a divider on the right and a front view of the divider on the left in accordance with embodiments of the disclosure.

FIG. 5A illustrates a pattern 500 for the basin of the sink 400 of FIG. 4 and FIG. 5B illustrates a divider 560 of the sink 400. The pattern 500 includes four rectangles 530a-530d, which become the four vertical sidewalls of the sink 400. Detailed descriptions for the four rectangles 530a-530d can be found in the description of the four rectangles 230a-230d of FIG. 2 above.

The pattern 500 further includes two drains 520a and 520b, of which descriptions can also be found when discussing the drain 220 of FIG. 2. In an aspect, the drain 520a on the right side may be positioned the same distance from the dotted edge of the rectangle 530a as the drain 520b from the dotted edge of the rectangle 350a. The position of the drain 520a may be determined independently from the position of the drain 520b. The size of the drains 520a and 520b may be determined based on the area of the corresponding basin.

Further, the pattern 500 also includes dash-dotted lines, which are to be pressed to make the dash-dotted lines groove downward to the drains 520a and 520b. Such grooves may be configured to facilitate water or any liquid to the drains 520a and 520b.

The bottom surface may be downwardly inclined toward the opening while pressing the dash-dotted lines. With the grooves and the downward inclination toward the drains 520a and 520b, the water or fluid contained in the sink can be drained efficiently.

Two bottoms 540a and 540b become bottom surfaces of two basins when the pattern 500 is cut and folded according to the solid, dotted, and dash-dotted lines thereon.

The pattern 500 further includes a strip or linear opening 555 for a divider. The strip 555 may have a width W and a length 2H+L. When solid lines of the strip 555 are cut, the inside is cut off and a strip-like opening is formed in the pattern 500. In particular, the opening is formed on the part of two vertical sidewalls formed in the rectangles 530a and 530c by H, and is formed between the bottoms 540a and 540b by L. In an aspect, the short edges of the strip 555 may be rounded. When the dash-dotted lines are pressed, the drains 520a and 520b may be lowered so that water or liquid can be led to the drains 520a and 520b. As such, the strip 555 may be distanced from both drains 520a and 520b so that the strip 555 and the divider can be welded with ease.

FIG. 5B illustrates a cross-sectional view of a divider 560 on the right and a front view of the divider 560 on the left. In an aspect, the material of the divider 560 may be the same as the material on which the pattern 500 is drawn. For example, the material is 16-gauge stainless steel, which is about 1.6 mm thick. In another aspect, the width of the strip 555 may be 4.0 mm, which is greater than twice the thickness of the 16-gauge stainless steel.

The width W of the divider 560 may be equal to the width W of the strip 555, and the height H of the divider 560 may be equal to H of the strip 555. The length L of the divider 560 may be equal to L of the strip 555. The length side of the divider 560 in the bottom may be welded into the part of the opening formed between the bottoms 540a and 540b. Both height sides of the divider 560 may be welded into the part of the opening formed in the vertical sidewalls, which are formed in the rectangles 530a and 530c.

In an aspect, the top part of the divider 560 may be rounded. As such, the short edges of the strip 555 may also be rounded so that the rounded part may fit into the rounded parts of the strip 555. In another aspect, the shape of the top part of the divider 560 may be rectangular, elliptical, or any other shape, which is to be matched with the shape of the short edges of the strip 555.

In aspects, the width of the divider 560 may be less than or equal to 4.0 mm When compared with dividers of conventional sinks, the width of the divider 560 is substantially smaller than those of the conventional sinks. Thus, the divider 560 takes up minimal amount of volume of the basin. Further, the welding is performed outside of the basin and welding marks are smoothened out. Thus, there are no welding marks seen from inside of the basin.

In aspects, the top part of the divider 560 may be thinner than the bottom part of the divider 560. As such, the divider 560 may be inserted into an opening of the strip 555 from the outside of the basin. Since the top part of the divider 560 is thinner than the width W of the strip 555, the divider 560 may be easily inserted into the opening of the strip 555. Further, it becomes easy to fit the bottom of the divider 560 to the bottom of the strip 555.

Further, the deck such as the deck 110 of FIG. 1 may be welded with the basin formed by the pattern 500. Welding may be also performed outside of the basin and welding marks and lines may be smoothened out. Further, the welding may be performed inside of the basin and the welding marks and lines may be smoothened out by a polishing tool, which may include a pencil-sized diamond polishing tool and any polishing tools suitable for removing welding marks and lines. As such, the welding marks between the deck and the basin cannot be seen from the inside and outside of the basin.

Figure 6:
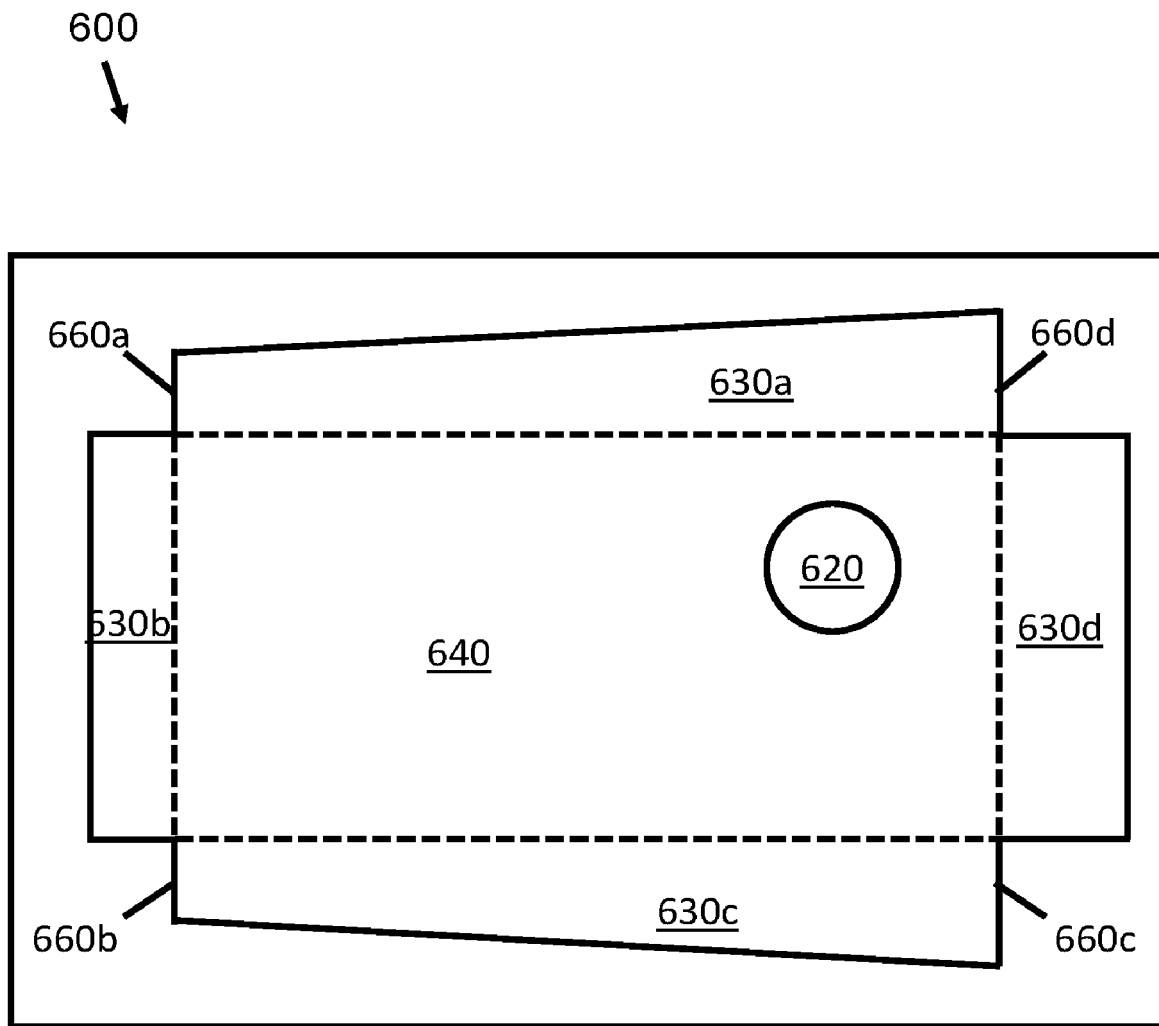
FIG. 6 is a diagram of a basin including an inclined bottom surface in accordance with embodiments of the disclosure.

FIG. 6 illustrates a pattern 600 for a basin, which has an inclined bottom surface 640a, in accordance with embodiments of the disclosure. The pattern 600 includes two parallelograms 630a and 630c. The parallelograms 630a and 630c include two parallel vertical sidewalls 660a, 660d and 660b, 660c, one is longer than the other. The length of the longer side 660d, 660c of the parallelograms 630a and 630c is equal to the length of the top and bottom of the rectangle 630d. The length of the shorter side 660a, 660b of the parallelograms 630a and 630c is equal to the length of the top and bottom of the rectangle 630b.

The drain 620 may be positioned toward the rectangle 630d rather than 630b so that the drain 620 is positioned toward the lower part of the inclination. Each edge of the bottom surface 640 may also have a cut-out corner such as the cut-out corner 250 of FIG. 2 so that each corner of the basin, when welded, can be made rounded. Further, the deck may be welded to the top of the basin formed by the pattern 600.

Figure 7A:
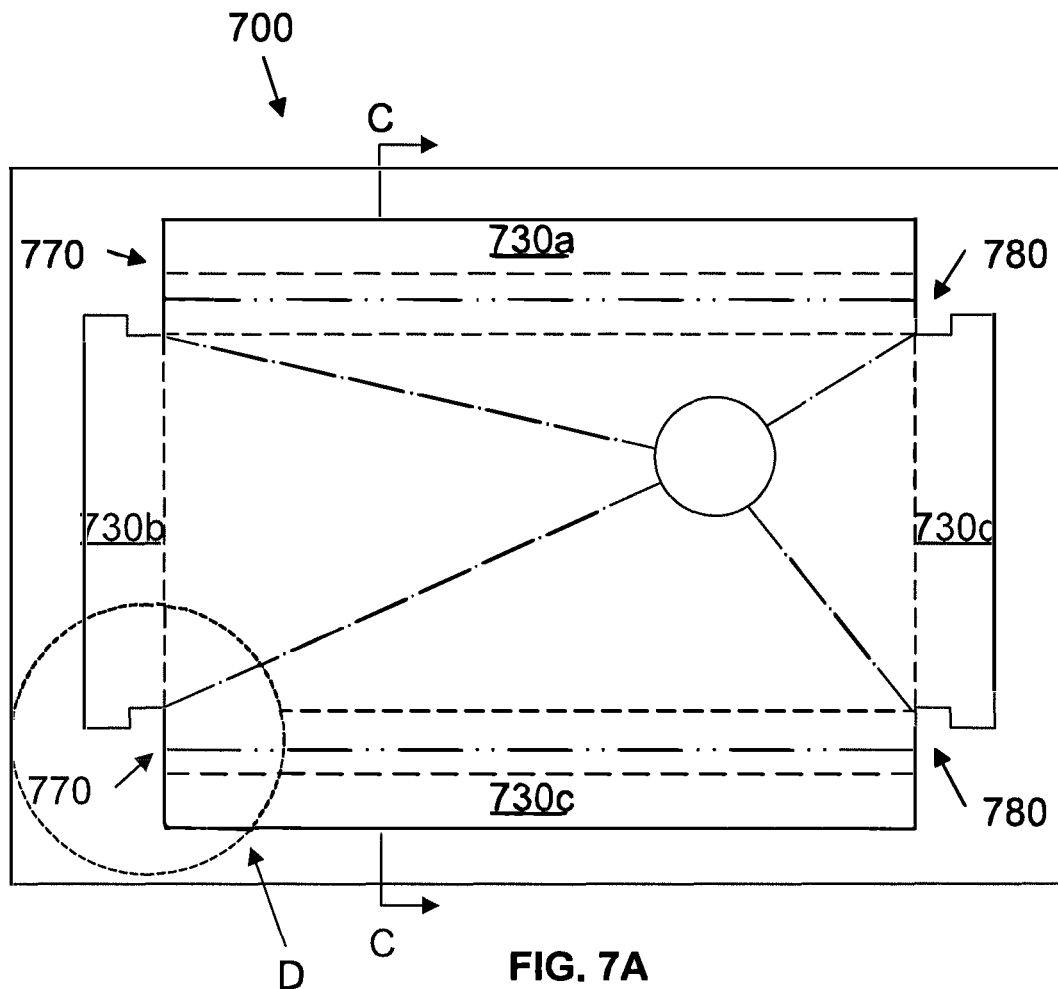
FIG. 7A is a diagram of a basin including a floating ledge in accordance with embodiments of the disclosure.
Figure 7B:
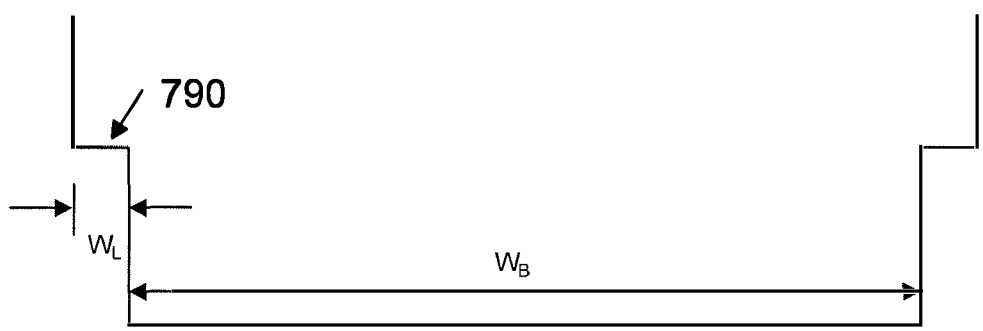
FIG. 7B is a cross-sectional view of the basin of FIG. 7A, when completed, in accordance with embodiments of the disclosure.

FIG. 7A illustrates a pattern 700 of a basin, which includes a floating deck or ledge 790 and FIG. 7B shows a cross-sectional view of the basin of FIG. 7A, when completed, along the direction C-C in accordance with embodiments of the disclosure. The floating deck 790 increases the volume of the basin, while the deck does not change the volume of the basin. The pattern 700 includes two rectangles 730a and 730c, which face each other. Each of the two rectangles 730a and 730c includes dotted lines 770 and dash-dot-dotted lines 780. The dotted lines 770 are to be folded in the same direction, i.e., inside the basin, as the other dotted lines in the pattern 700. The dash-dot-dotted lines 780 are to be folded toward the outside of the basin. In particular, dotted lines 770 are to be folded about 90 degrees toward the inside of the basin, while the dash-dot-dotted lines 780 are to be folded about 90 degrees toward the outside of the basin. Thus, when folded properly, the part between the dotted lines 770 and the dash-dot-dotted line 780 forms the floating deck 790, which is substantially parallel with the bottom surface of the basin. As such, the floating deck 790 is not welded to the basin. The width of the floating deck 790 may be less than or equal to about 0.59 inches.

The floating deck 790 neither decreases nor increases the volume of the basin. In an aspect, the pattern 700 may include two or more pairs of the dotted lines 770 and the dash-dot-dotted lines 780 so that the basin has two or more floating decks. The floating deck formed on the both vertical sidewalls 730a and 730c may be used to put a working board or accessory thereon, so as to put items (e.g., dishes, kitchen utensils, etc.) while washing or for handling, storing or cutting food.

Further, the shapes of two vertical sidewalls 730b and 730d are adjusted according to the floating deck formed by the dotted lines 770 and the dash-dot-dotted lines 780 in the vertical sidewalls 730a and 730c, and are matingly-welded to the vertical sidewalls 730b and 730d. The top surface of the basin may be welded to a deck such as the deck 110 of FIG. 1.

In an aspect, the floating deck may be formed on the short sides of the basin or on all vertical sidewalls of the basin. In another aspect, when there are two floating decks in the basin, one floating deck may be formed along the long side and the other floating deck may be formed along the short side. A cutting board or a rolling mat may be placed on the first floating deck formed along the long side and another accessory may be placed on the second floating deck formed along the short side. In still another aspect, two floating deck may be formed along the same direction, the long or short side of the basin.

In case when the floating decks are formed on the two facing short vertical sidewalls 730b and 730d of the basin, an accessory such as a cutting board may sit on the floating decks. As shown in FIG. 7B, the width of the floating deck 790 is WL and the width of the lower portion of the basin 700 is WB. As such, an accessory can sit on the two floating decks 790 when the width of the accessory is greater than WB+WL and less than or equal to WB+2WL. Based on the length of the basin 700, two or more accessories may sit on the floating deck 790 at the same time, when the sum of the lengths of two or more accessories is less than or equal to the length of the basin 700.

In case when two or more levels of floating decks are vertically formed on the same two facing sides of the basin 700, accessories having different dimensions may sit on different levels of the floating decks. The accessories are dimensioned and configured to sit on the corresponding floating deck.

Figure 7C:
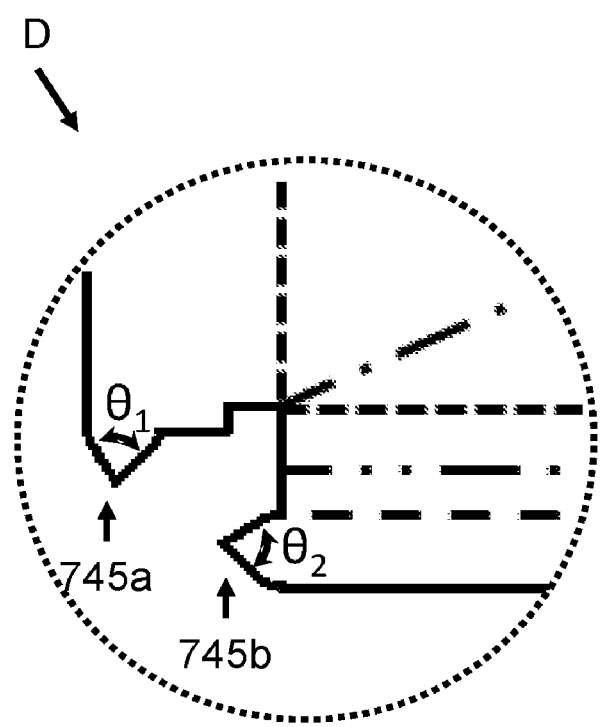
FIG. 7C is an expanded view of "D" of FIG. 7A in accordance with embodiments of the disclosure.

FIG. 7C is the expanded view of "D" in FIG. 7A in accordance with embodiments of the present disclosure. Two vertical sidewalls 730b and 730c have two sharp protrusions 745a and 745b from the top thereof. When folded and welded together, the two sharp protrusions 745a and 745b form a deck of the sink 700. In an aspect, the angle 81 of the sharp protrusion 745a and the angle 82 of the sharp protrusion 745b may be 90° so that the sharp protrusions 745a and 745b fit to each other when welded together. In another aspect, 81 and 82 do not have to be a right angle and thus, the sum of 81 and 82 may be 180°. Therefore, the sink made with this design may not require a deck, as shown in FIGS. 3A and 3B, to be welded thereto. Further, the pattern having these two sharp protrusions 745a and 745b may be applied to any designs shown in FIGS. 2A-7A.

Each embodiment as shown in FIGS. 1-7C is not limited thereto but can be combined with each other to form a sink as appreciated by a person having ordinary skill in the art. Further, other types of sink may be also encompassed by this disclosure without departing from the spirit of this disclosure.

Figure 8:
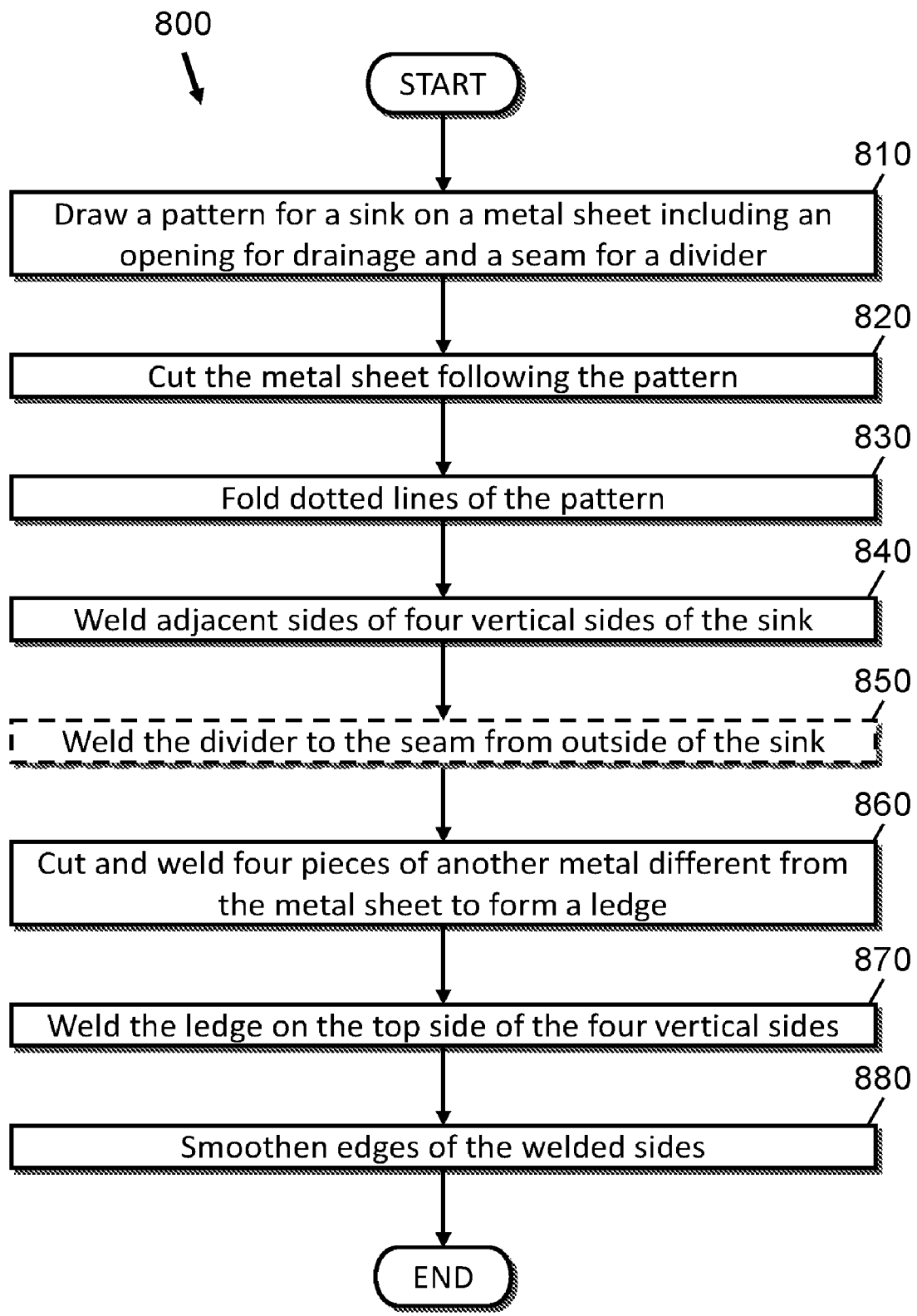
FIG. 8 is a flow diagram showing a method of making a sink in accordance with embodiments of the disclosure.

FIG. 8 illustrates a method 800 for manufacturing a sink in accordance with embodiments of the present disclosure. The method 800 begins by drawing a pattern for a basin of a sink on a metal sheet in step 810. The pattern may include an opening for a drain and a rectangular strip for a divider. In an aspect, the rectangular strip for the divider may not be included in the pattern. The thickness of the metal sheet may be less than or equal to 16-gauge or about 1.6 mm The pattern may include solid lines, which are to be cut, and dotted lines, which are to be folded 90 degrees toward an inside of the basin. Further, the pattern may include dash-dotted lines, which are to be pressed to make the dash-dotted lines grooves downward. Furthermore, the pattern may include dash-dot-dotted lines, which are to be folded 180 degrees toward an outside of the basin.

In step 820, the solid lines are cut. An opening for a drain is also in solid lines. After cutting the solid lines on the metal sheet, the metal sheet becomes a skeleton for a basin of the sink. The cutting may be done by laser, high energy light, water, or any other means to cut the metal sheet.

In step 830, the dotted lines of the pattern are folded to form four vertical sidewalls of the basin. The dash-dotted lines are pressed so as to make a water way to the drainage in the bottom surface of the basin. Pressing may create a declining angle of from about 3° to about 8° from the main level of the base of the sink so that water can be drained toward the drainage. In a case when the pattern includes dash-dot-dotted lines, the dash-dot-dotted lines are folded by 90 degrees toward the outside of the basin so as to form a floating deck, as shown in FIGS. 7A and 7B.

The adjacent edges of the four vertical sidewalls are welded together in step 840. The welding may be performed from the outside of the basin so that the welding marks are not seen from the inside of the basin.

The main basin may be divided into two or more smaller basins. In this case, each basin is separated by a divider. In this case, the pattern may also include a strip of solid lines, which are to be cut, inside of the basin. Step 850 may be performed for a sink having a divider. When the solid lines are cut in step 820, the strip is also cut to leave a long strip of an opening.

The divider may be cut out from the same metal sheet as the basin and folded in half. Thus, the width of the divider may be slightly greater than twice the thickness of the metal sheet. In an aspect, the metal sheet may be stainless steel, of which the thickness may be less than or equal to 16-gauge, and the width of the divider may be less than or equal to about 4.0 mm. The top of the divider may be thinner than the bottom of the divider. Thus, the bottom of the divider may easily fit to the opening of the strip by inserting the top of the divider from outside of the basin and from the bottom into the opening of the strip. The divider may then be welded into the opening. Welding may also be performed from the outside of the basin.

In step 860, four rectangular pieces of another metal sheet different from that for the basin are cut and welded together to form a rectangular rim, configured as a deck of the sink. The inside of the rectangular rim may fit to the top rectangular opening of the basin. The metal sheet for the deck may be thicker than the metal sheet for the basin. In an aspect, the thickness of the deck may be greater than or equal to 3.0 mm, and the thickness of the metal sheet for the basin may be 16 gauge, about 1.6 mm. By making a deck thicker than the basin, the sink is configured to sit tightly on a countertop of a kitchen cabinet.

In step 870, the inside of the rectangular rim and the top edges of the basin are welded together. The welding may be performed from the outside of the basin. In an aspect, the deck may be beveled at the outer part of the rectangular rim. When the deck welded with the basin is located on the countertop of the kitchen cabinet, the deck touches the top surface of the countertop. The beveled edge provides a smooth transition from the top surface of the countertop to the deck of the sink.

In step 880, the welded parts or edges are smoothened out. For example, the welded parts of the four vertical sidewalls and welded parts between the deck and the basin are smoothened out outside of the sink. In an aspect, smoothening the welded parts may be performed inside of the basin to remove any welding marks or any other visible marks. The method 800 ends after the smoothening process in step 880.

Figure 9:
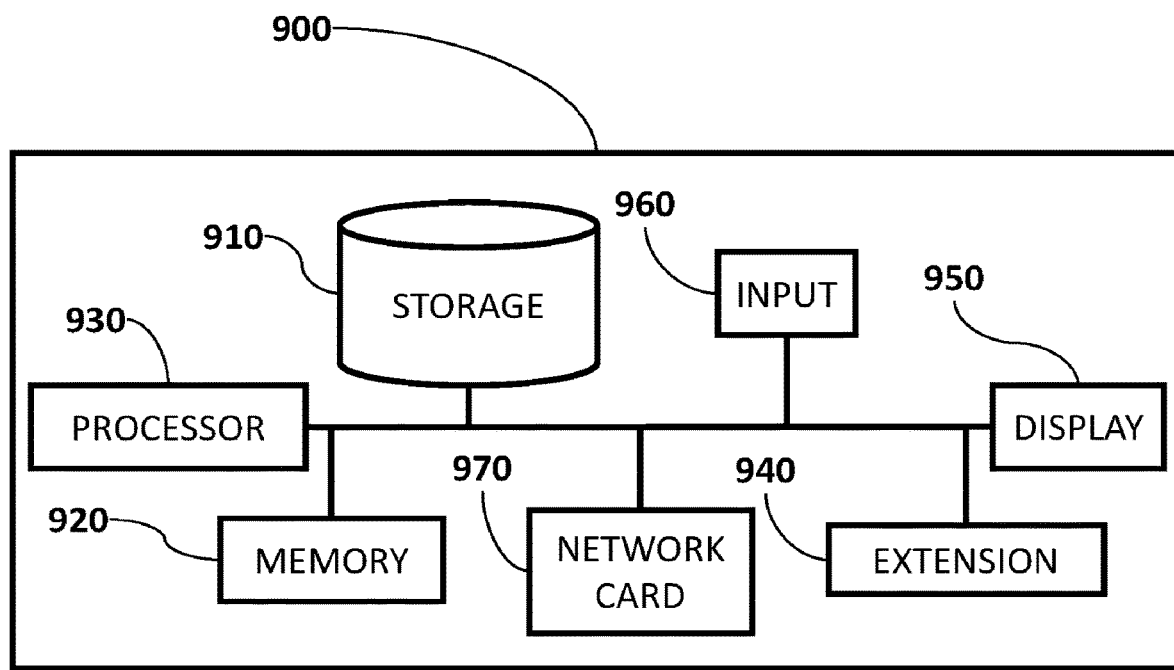
FIG. 9 is a block diagram for performing operations to make a sink in accordance with embodiments of the disclosure.

FIG. 9 is a block diagram for a computing device 900, which is configured to perform operations to make a sink in accordance with embodiments of the disclosure. The computing device 900 may be connected to one or more external devices and control the external devices to cut, fold, and weld metal sheets so as to make a sink by performing steps of the method 800. The computing device 900 may include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, embedded computers, and autonomous vehicles. Those of skill in the art will recognize that many smartphones are suitable for use in the system described herein. Suitable tablet computers include those with booklet, slate, and convertible configurations, known to those of skill in the art.

In some embodiments, the computing device 900 includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the computing device 900 may include a storage 910 and a memory 920. The storage 910 and the memory 920 may be one or more physical apparatus used to store data or programs on a temporary or permanent basis. In some embodiments, the storage 910 may be volatile memory and requires power to maintain stored information. In some embodiments, the storage 910 may be non-volatile memory and retains stored information when the computing device 900 is not powered. In some embodiments, the non-volatile memory includes flash memory. In some embodiments, the non-volatile memory includes dynamic random-access memory (DRAM). In some embodiments, the non-volatile memory includes ferroelectric random-access memory (FRAM). In some embodiments, the non-volatile memory includes phase-change random access memory (PRAM). In some embodiments, the storage 910 includes, by way of non-limiting examples, CD-ROMs, DVDs, flash memory devices, magnetic disk drives, magnetic tapes drives, optical disk drives, and cloud computing-based storage. In some embodiments, the storage 910 may be a combination of devices such as those disclosed herein.

The computing device 900 further includes a processor 930, an extension 940, a display 950, an input device 960, and a network card 970. The processor 930 is a brain to the computing device 900. The processor 930 executes instructions which implement tasks or functions of programs. When a user executes a program, the processor 930 reads the program stored in the storage 910, loads the program on the RAM, and executes instructions prescribed by the program.

The processor 930 may include a microprocessor, central processing unit (CPU), application specific integrated circuit (ASIC), arithmetic coprocessor, graphic processor, or image processor, each of which is electronic circuitry within a computer that carries out instructions of a computer program by performing the basic arithmetic, logical, control and input/output (I/O) operations specified by the instructions.

In embodiments, the extension 940 may include several ports, such as one or more universal serial buses (USBs), IEEE 1394 ports, parallel ports, and/or expansion slots such as peripheral component interconnect (PCI) and PCI express (PCie). The extension 940 is not limited to the list but may include other slots or ports that can be used for appropriate purposes. The extension 940 may be used to install hardware or add additional functionalities to a computer that may facilitate the purposes of the computer. For example, a USB port can be used for adding additional storage to the computer and/or an IEEE 1394 may be used for receiving moving/still image data.

In some embodiments, the display 950 may be a cathode ray tube (CRT), a liquid crystal display (LCD), or light emitting diode (LED). In some embodiments, the display 950 may be a thin film transistor liquid crystal display (TFT-LCD). In some embodiments, the display 950 may be an organic light emitting diode (OLED) display. In various some embodiments, the OLED display is a passive-matrix OLED (PMOLED) or active-matrix OLED (AMOLED) display. In some embodiments, the display 950 may be a plasma display. In some embodiments, the display 950 may be a video projector. In some embodiments, the display may be interactive (e.g., having a touch screen or a sensor such as a camera, a 3D sensor, a LiDAR, a radar, etc.) that can detect user interactions/gestures/responses and the like.

In still some embodiments, the display 950 is a combination of devices such as those disclosed herein.

A user may input and/or modify data via the input device 960 that may include a keyboard, a mouse, or any other device with which the user may input data. The display 950 displays data on a screen of the display 950. The display 950 may be a touch screen so that the display 950 can be used as an input device.

The network card 970 is used to communicate with other computing devices, wirelessly or via a wired connection. Through the network card 970, the autonomous vehicle may receive, modify, and/or update data from and to a managing server.

Any of the herein described methods, programs, algorithms or codes may be converted to, or expressed in, a programming language or computer program The terms "programming language" and "computer program," as used herein, each include any language used to specify instructions to a computer, and include (but is not limited to) the following languages and their derivatives: Assembler, Basic, Batch files, BCPL, C, C+, C++, C #, Delphi, Fortran, Java, JavaScript, machine code, operating system command languages, Pascal, Perl, PL1, python, scripting languages, Visual Basic, meta-languages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program Thus, reference to a program, where the programming language could exist in more than one state (such as source, compiled, object, or linked) is a reference to any and all such states. Reference to a program may encompass the actual instructions and/or the intent of those instructions.

It should be understood that the foregoing description is only illustrative of the present disclosure. Various alternatives and modifications can be devised by those skilled in the art without departing from the disclosure. Accordingly, the present disclosure is intended to embrace all such alternatives, modifications and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. A sink comprising:
   a bottom surface forming an opening for drainage therein;
   a first sidewall, a second sidewall, a third sidewall, and a fourth sidewall, each of which is extended from the bottom surface;
   a ledge fixedly attached to top ends of the first, second, third, and fourth sidewalls;
   wherein the bottom surface and the first, second, third, and fourth sidewalls have a same thickness;
   wherein a thickness of the ledge is different from the thickness of the bottom surface; and a divider fixedly attached to a linear opening in the first and third sidewalls and the bottom surface.

2. The sink according to claim 1, wherein a width of the divider is less than or equal to 5 mm.

3. The sink according to claim 1, wherein the divider is welded to the linear opening.

4. The sink according to claim 1, wherein the divider includes a rounded top part.

5. The sink according to claim 1, wherein the divider includes a top part and a bottom part, the top part thinner than the bottom part.

6. The sink according to claim 1, wherein the divider includes a first member and a second member defining a U-shaped cross-section.

7. The sink according to claim 1, wherein an outer part of the ledge has a decreasing thickness as it extends outwardly, such that the outer part of the ledge is beveled downwardly toward the countertop.

8. A sink comprising:
   a bottom surface including an opening for drainage;
   a first sidewall, a second sidewall, a third sidewall, and a fourth sidewall, each of which extends upwardly from the bottom surface;
   a linear opening formed within the first sidewall, the third sidewall and the bottom surface; and
   a divider fixedly attached to the linear opening.

9. The sink according to claim 8, further comprising:
   a ledge fixedly attached to top ends of the first, second, third, and fourth sidewalls;
   wherein the bottom surface and the first, second, third, and fourth sidewalls have a same thickness; and
   wherein a thickness of the ledge is different from the thickness of the bottom surface.

10. The sink according to claim 8, further comprising:
    a ledge fixedly attached to top ends of the first, second, third, and fourth sidewalls; and
    wherein an outer part of the ledge has a decreasing thickness as it extends outwardly, such that the outer part of the ledge is beveled downwardly toward a countertop.

11. The sink according to claim 8, wherein a width of the divider is less than or equal to 5 mm.

12. The sink according to claim 8, wherein the divider is welded to the linear opening.

13. The sink according to claim 8, wherein the divider includes a rounded top part.

14. The sink according to claim 8, wherein the divider includes a top part and a bottom part, the top part thinner than the bottom part.

15. The sink according to claim 8, wherein the divider includes a first member and a second member defining a U-shaped cross-section.

16. A sink comprising:
a bottom surface including an opening for drainage;
a first sidewall, a second sidewall, a third sidewall, and a fourth sidewall, each of which extends upwardly from the bottom surface;
a linear opening formed within the first sidewall, the third sidewall and the bottom surface; and
a divider welded to the linear opening, wherein a width of the divider is less than or equal to 5 mm.

17. The sink according to claim 16, wherein the divider includes a rounded top part.

18. The sink according to claim 16, wherein the divider includes a top part and a bottom part, the top part thinner than the bottom part.

19. The sink according to claim 16, wherein the divider includes a first member and a second member defining a U-shaped cross-section.

20. The sink according to claim 16, further comprising:
a ledge fixedly attached to top ends of the first, second, third, and fourth sidewalls; and
wherein an outer part of the ledge has a decreasing thickness as it extends outwardly, such that the outer part of the ledge is beveled downwardly toward a countertop.

21. The sink according to claim 16, further comprising:
a ledge fixedly attached to top ends of the first, second, third, and fourth sidewalls, wherein the bottom surface and the first, second, third, and fourth sidewalls have a same thickness; and
wherein a thickness of the ledge is different from the thickness of the bottom surface.

* * * * *